United States Patent
Luo et al.

(10) Patent No.: US 12,484,029 B2
(45) Date of Patent: Nov. 25, 2025

(54) METHOD PERFORMED BY USER EQUIPMENT, AND USER EQUIPMENT

(71) Applicant: Sharp Kabushiki Kaisha, Osaka (JP)

(72) Inventors: Chao Luo, Shanghai (CN); Renmao Liu, Shanghai (CN); Yinan Zhao, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 547 days.

(21) Appl. No.: 17/914,461

(22) PCT Filed: Mar. 25, 2021

(86) PCT No.: PCT/CN2021/083043
§ 371 (c)(1),
(2) Date: Sep. 26, 2022

(87) PCT Pub. No.: WO2021/197204
PCT Pub. Date: Oct. 7, 2021

(65) Prior Publication Data
US 2023/0124535 A1 Apr. 20, 2023

(30) Foreign Application Priority Data
Mar. 31, 2020 (CN) .................. 202010248055.X

(51) Int. Cl.
*H04W 72/0446* (2023.01)
*H04L 5/00* (2006.01)
*H04L 5/14* (2006.01)

(52) U.S. Cl.
CPC ....... *H04W 72/0446* (2013.01); *H04L 5/0092* (2013.01); *H04L 5/14* (2013.01)

(58) Field of Classification Search
CPC ..... H04W 72/0446; H04L 5/0092; H04L 5/14
See application file for complete search history.

(56) References Cited

PUBLICATIONS

Huawei et al., "Sidelink synchronization mechanisms for NR V2X", 3GPP TSG RAN WG1 Meeting #99, Reno, USA, Nov. 18-22, 2019, R1-1911885 (Year: 2019).*
3GPP TS 38.213 V 15.7.0 (Sep. 2019), 3rd Generation Partnership Project; Technical Specification Group Radio Access Network; NR; Physical layer procedures for control (Release 15) (Year: 2019).*
LG Electronics et al., "New WID on 5G V2X with NR sidelink", 3GPP TSG RAN Meeting #83, RP-190766, Mar. 18-21, 2019, 8 pages.
NTT Docomo, Inc., "New WID on New Radio Access Technology", 3GPP TSG RAN Meeting #75, RP-170855, Mar. 6-9, 2017, 12 pages.
Huawei et al., "New WID on 3GPP V2X Phase 2", 3GPP TSG RAN Meeting #75, RP-170798, Mar. 6-9, 2017, 5 pages.
LG Electronics et al., "New WI proposal: Support for V2V services based on LTE sidelink", 3GPP TSG RAN Meeting #70, RP-152293, Dec. 7-10, 2015, 8 pages.

* cited by examiner

*Primary Examiner* — Joseph A Bednash
(74) *Attorney, Agent, or Firm* — Keating & Bennett, LLP

(57) ABSTRACT

According to the present invention, a method performed by user equipment and user equipment are provided. The method performed by the user equipment is characterized by including: acquiring resource pool-related information; and determining a slot set in a resource pool. The resource pool-related information includes an SL subcarrier spacing configuration, a duplex mode, TDD configuration information, a time-domain resource period, a time-domain resource indication, and S-SSB-related information.

7 Claims, 1 Drawing Sheet

METHOD PERFORMED BY USER EQUIPMENT, AND USER EQUIPMENT

TECHNICAL FIELD

The present invention relates to a method performed by user equipment, and user equipment.

BACKGROUND

In 5G V2X, how to determine a slot set in a resource pool under different system configurations is a problem that needs to be solved.

PRIOR ART DOCUMENTS

Non-Patent Documents

Non-Patent Document 1: RP-152293, New WI proposal: Support for V2V services based on LTE sidelink
Non-Patent Document 2: RP-170798, New WID on 3GPP V2X Phase 2
Non-Patent Document 3: RP-170855, New WID on New Radio Access Technology
Non-Patent Document 4: RP-190766, New WID on 5G V2X with NR sidelink

SUMMARY

In order to address at least part of the aforementioned issues, the present invention provides a method performed by user equipment, and user equipment. By flexibly determining a slot set in a resource pool, different UEs can perform efficient SL transmission and reception on the basis of the same resource pool.

According to the present invention, a method performed by user equipment is provided. The method is characterized by comprising: acquiring resource pool-related information; and determining a slot set in a resource pool. The resource pool-related information comprises an SL subcarrier spacing configuration, a duplex mode, TDD configuration information, a time-domain resource period, a time-domain resource indication, and S-SSB-related information.

Preferably, quasi-uplink slots in a TDD configuration period are determined according to the TDD configuration information, wherein the quasi-uplink slots are slots in which at least a symbol $1_{start}^{SL}$, a symbol $1_{start}^{SL}+1, \ldots$, and a symbol $1_{start}^{SL}+N_{length}-1$ are configured to be uplink symbols. $1_{start}^{SL}$ is a number of the first symbol configured to be used for SL transmission, and $N_{length}^{SL}$ is the number of symbols configured to be used for SL transmission.

Preferably, if a first TDD pattern has been configured, and if a second TDD pattern has not been configured, then the quasi-uplink slots in the TDD configuration period are the last $N_{USlot,1}^{TDD}$ slots in a period of the first TDD pattern, wherein $N_{ULSlot,1}^{TDD} = u_{slots} \cdot 2^{\mu-\mu_{ref}} + \lfloor u_{sym} \cdot 2^{\mu-\mu_{ref}}/N_{symb}^{slot} \rfloor + N_{0,1}$, if $((u_{sym} \cdot 2^{\mu-\mu_{ref}}) \bmod N_{symb}^{slot}) \geq N_{symb}^{slot} - 1_{start}^{SL}$, then $N_{0,1}=1$, otherwise $N_{0,1}=0$, and $\mu$, $\mu_{ref}$, $u_{slots}$, $u_{sym}$, $N_{symb}^{slot}$, and $1_{start}^{SL}$ are respectively the SL subcarrier spacing configuration, a reference subcarrier spacing in the TDD configuration, the number of full uplink slots in the first TDD pattern, the number of uplink symbols in the first TDD pattern, the number of symbols in one slot, and a number of the first symbol configured to be used for SL transmission.

Preferably, if the first TDD pattern has been configured, and if the second TDD pattern has been configured, then the quasi-uplink slots in the TDD configuration period comprise the last $N_{USlot,1}^{TDD}$ slots in the period of the first TDD pattern and the last $N_{USlot,2}^{TDD}$ slots in a period of the second TDD pattern, wherein $2^{\mu-\mu}$ $$N_{ULSlot,1}^{TDD} = u_{slots} \cdot 2^{\mu-\mu_{ref}} + \left\lfloor \frac{(u_{sym} \cdot 2^{\mu-\mu_{ref}})}{N_{symb}^{slot}} \right\rfloor + N_{0,1},$$

and if $((u_{sym} \cdot 2^{\mu-\mu_{ref}}) \bmod N_{symb}^{slot}) \geq N_{symb}^{slot} - 1_{start}^{SL}$, then $N_{0,1} = 1$, otherwise $N_{0,1} = 0$. $N_{ULSlot,2}^{TDD} = u_{slots,2} \cdot 2^{\mu-\mu_{ref}} + \left\lfloor \frac{(u_{sym,2} \cdot 2^{\mu-\mu_{ref}})}{N_{symb}^{slot}} \right\rfloor + N_{0,2},$ wherein if $((u_{sym,2} \cdot 2^{\mu-\mu_{ref}}) \bmod N_{symb}^{slot}) \geq N_{symb}^{slot} - 1_{start}^{SL}$, then $N_{0,2}=1$, otherwise $N_{0,2}=0$, and $\mu$, $\mu_{ref}$, $u_{slots}$, $u_{sym}$, $u_{slots,2}$, $u_{sym,2}$, $N_{symb}^{slot}$, and $1_{start}^{SL}$ are respectively the SL subcarrier spacing configuration, a reference subcarrier spacing in the TDD configuration, the number of full uplink slots in the first TDD pattern, the number of uplink symbols in the first TDD pattern, the number of full uplink slots in the second TDD pattern, the number of uplink symbols in the second TDD pattern, the number of symbols in one slot, and a number of the first symbol configured to be used for SL transmission.

Preferably, the time-domain resource indication corresponds to a bitmap, and a length of the bitmap is related to the number of quasi-uplink slots in the TDD configuration period.

Preferably, the time-domain resource indication corresponds to a bitmap, and a length of the bitmap is related to the SL subcarrier spacing configuration.

Preferably, the time-domain resource indication corresponds to a bitmap, and a length of the bitmap is related to the TDD configuration period.

Preferably, the last $N_{removed}$ elements in the slot set in the resource pool are removed before the time-domain resource indication is used, wherein $N_{removed}=N_{RP,0} \bmod N_{PSSCH}^{PSFCH}$, wherein $N_{RP,0}$ is equal to the number of elements in the slot set in the resource pool before the $N_{removed}$ elements are removed, and $N_{PSSCH}^{PSFCH}$ is equal to a PSFCH resource configuration period.

Preferably, the last $N_{removed}$ elements in the slot set in the resource pool are removed after the time-domain resource indication is used, wherein $N_{removed}=N_{RP,0} \bmod N_{PSSCH}^{PSFCH}$, $N_{RP,0}$ is equal to the number of elements in the slot set in the resource pool before the $N_{removed}$ elements are removed, and $N_{PSSCH}^{PSFCH}$ is equal to a PSFCH resource configuration period.

In addition, according to the present invention, provided is user equipment, comprising: a processor; and a memory, having instructions stored therein, wherein when run by the processor, the instructions perform the aforementioned method.

Therefore, the present invention provides a method in which a slot set in a resource pool is flexibly determined so that different UEs can perform efficient SL transmission and reception on the basis of the same resource pool.

BRIEF DESCRIPTION OF THE DRAWINGS

The above and other features of the present invention will be more apparent from the following detailed description in combination with the accompanying drawings, in which.

DETAILED DESCRIPTION

Figure 1:
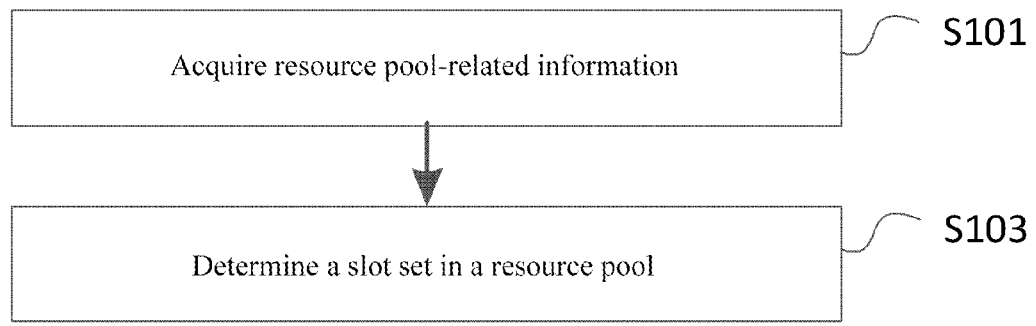
FIG. 1 is a flowchart showing a method performed by user equipment according to Embodiment 1 of the present invention.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following implementations, but is applicable to many other wireless communication systems, such as a communication system after 5G and a 4G mobile communication system before 5G.

Some terms involved in the present invention are described below. Unless otherwise specified, the terms used in the present invention adopt the definitions herein. The terms given in the present invention may vary in LTE, LTE-Advanced, LTE-Advanced Pro, NR, and subsequent communication systems, but unified terms are used in the present invention. When applied to a specific system, the terms may be replaced with terms used in the corresponding system.

3GPP: 3rd Generation Partnership Project
AGC: Automatic Gain Control
  AL: Aggregation Level
AS: Access Stratum
  BWP: Bandwidth Part
CA: Carrier Aggregation
  CCE: Control Channel Element
CORESET: Control Resource Set
  CP: Cyclic Prefix
  CP-OFDM: Cyclic Prefix Orthogonal Frequency Division Multiplexing
CRB: Common Resource Block
  CRC: Cyclic Redundancy Check
CSI: Channel-State Information
  CSS: Common Search Space
DC: Dual Connectivity
  DCI: Downlink Control Information
DFN: Direct Frame Number
  DFT-s-OFDM: Discrete Fourier Transformation Spread Orthogonal Frequency Division Multiplexing
DL: Downlink
  DL-SCH: Downlink Shared Channel
  DM-RS: also referred to as DMRS, Demodulation Reference Signal
  eMBB: Enhanced Mobile Broadband, (enhanced mobile broadband communication)
  eNB: E-UTRAN Node B
  E-UTRAN: Evolved UMTS Terrestrial Radio Access Network
FDD: Frequency Division Duplex
  FDRA: Frequency Domain Resource Assignment
  FR1: Frequency Range 1
  FR2: Frequency Range 2
  GLONASS: GLObal NAvigation Satellite System
  gNB: NR Node B
GNSS: Global Navigation Satellite System
  GPS: Global Positioning System
HARQ: Hybrid Automatic Repeat Request
  ID: Identity (or Identifier)
IE: Information Element
  IP: Internet Protocol
LCID: Logical Channel ID, Logical Channel Identifier
  LSB: Least Significant Bit
LTE: Long Term Evolution
  LTE-A: Long Term Evolution-Advanced
MAC: Medium Access Control
  MAC CE: MAC Control Element
MCG: Master Cell Group
  MIB: Master Information Block
  MIB-SL: Master Information Block-Sidelink
  MIB-SL-V2X: Master Information Block-Sidelink-Vehicle to Everything
  MIB-V2X: Master Information Block-Vehicle to Everything
MSB: Most Significant Bit
  mMTC: massive Machine Type Communication
NAS: Non-Access Stratum
  NDI: New Data Indicator
NR: New Radio
  NUL: Normal Uplink
OFDM: Orthogonal Frequency Division Multiplexing
  PBCH: Physical Broadcast Channel
PDCCH: Physical Downlink Control Channel
  PDCP: Packet Data Convergence Protocol.
PDSCH: Physical Downlink Shared Channel
  PSBCH: Physical Sidelink Broadcast Channel
PSCCH: Physical Sidelink Control Channel
  PSFCH: Physical Sidelink Feedback Channel
PSSCH: Physical Sidelink Shared Channel
  PRB: Physical Resource Block
PSS: Primary Synchronization Signal
  PSS-SL: Primary Synchronization Signal for Sidelink
PSSS: Primary Sidelink Synchronization Signal
  PTAG: Primary Timing Advance Group
PUSCH: Physical Uplink Shared Channel
  PUCCH: Physical Uplink Control Channel
QCL: Quasi Co-Location
  QoS: Quality of Service
QZSS: Quasi-Zenith Satellite System
  RAR: Random Access Response
RB: Resource Block
  RE: Resource Element
REG: Resource-Element Group
  RF: Radio Frequency
RLC: Radio Link Control
  RNTI: Radio Network Temporary Identifier
RRC: Radio Resource Control
  RV: Redundancy Version
  S-BWP: Sidelink Bandwidth Part
  S-MIB: Sidelink Master Information Block
  S-PSS: Sidelink Primary Synchronization Signal
  S-SSB: Sidelink SS/PBCH Block (Sidelink Synchronization Signal/Physical Broadcast Channel Block)
  S-SSS: Sidelink Secondary Synchronization Signal
SCG: Secondary Cell Group
  SCI: Sidelink Control Information
  SCS: Subcarrier Spacing
  SDAP: Service Data Adaptation Protocol
SFN: System Frame Number
  SIB: System Information Block
SL: Sidelink
  SL BWP: Sidelink Bandwidth Part SL MIB: Sidelink Master Information Block
SL PSS: Sidelink Primary Synchronization Signal
SL SS: Sidelink Synchronization Signal
SL SSID: Sidelink Synchronization Signal Identity (or Sidelink Synchronization Signal Identifier)
SL SSB: Sidelink SS/PBCH Block (Sidelink Synchronization Signal/Physical Broadcast Channel Block)
SL SSS: Sidelink Secondary Synchronization Signal
SLSS: Sidelink Synchronization Signal
SLSS ID: Sidelink Synchronization Signal Identity (or Sidelink Synchronization Signal Identifier)
SLSSID: Sidelink Synchronization Signal Identity (or Sidelink Synchronization Signal Identifier)
SpCell: Special Cell
SRS: Sounding Reference Signal
SSB: SS/PBCH Block (Synchronization Signal/Physical Broadcast Channel Block)
SSB-SL: SS/PBCH Block for Sidelink (Sidelink Synchronization Signal/Physical Broadcast Channel Block)
SSS: Secondary Synchronization Signal
SSS-SL: Secondary Synchronization Signal for Sidelink
SSSB: Sidelink SS/PBCH Block (Sidelink Synchronization Signal/Physical Broadcast Channel Block)
SSSS: Secondary Sidelink Synchronization Signal
STAG: Secondary Timing Advance Group
Sub-channel: Sub-channel
SUL: Supplementary Uplink
TA: Timing Advance
TAG: Timing Advance Group
TB: Transport Block
TCP: Transmission Control Protocol
TDD: Time Division Duplex
TPC: Transmit Power Control
UE: User Equipment
UL: Uplink
UMTS: Universal Mobile Telecommunications System
URLLC: Ultra-Reliable and Low Latency Communication
USS: UE-specific Search Space
V2I: Vehicle-to-Infrastructure
V2N: Vehicle-to-Network
V2P: Vehicle-to-Pedestrian
V2V: Vehicle-to-Vehicle
V2X: Vehicle-to-Everything
VRB: Virtual Resource Block Unless otherwise specified, in all embodiments and implementations of the present invention:

Optionally, "send" and "transmit" are interchangeable with each other where applicable.

Optionally, "in an SL carrier" and "on an SL carrier" are interchangeable with each other where applicable.

Optionally, "in an SL BWP" and "on an SL BWP" are interchangeable with each other where applicable.

Optionally, if $S_1$ and $S_2$ are two sets, then $S_1-S_2$ represents a "difference set" of the set $S_1$ and the set $S_2$, namely a set of elements in the set $S_1$ not belonging to the set $S_2$.

Optionally, if $S_1$ and $S_2$ are two sets, then $S_1-S_2=\{x|x\in S_1 \text{ and } x\notin S_2\}$.

Optionally, performing operations (such as filtering, transformation, etc.) on elements in the set $S_1$ to acquire a set $S_2$ can be equivalent to directly performing operations on the original set $S_1$ to acquire an updated set $S_1$.

Optionally, "higher layer" may refer to one or more protocol layers or protocol sub-layers above a physical layer. For example, a MAC layer, an RLC layer, a PDCP layer, a PC5 RRC layer, a PC5-S layer, an RRC layer, a V2X layer, an application layer, a V2X application layer, or the like.

Optionally, "pre-configuration" may be pre-configuration performed by means of a higher-layer protocol/signaling. For example, it is pre-configured in a specific storage location in the UE (for example, it is pre-configured according to the specification of the higher layer protocol), or it is pre-configured in a specific accessible storage location in the UE (for example, it is pre-configured according to the specification of the higher layer protocol).

Optionally, "configuration" may be configuration performed by means of a higher layer protocol/signaling. For example, configuration is performed for the UE by means of RRC signaling.

Optionally, a time-domain resource may also be referred to as a time resource.

Optionally, a frequency-domain resource may also be referred to as a frequency resource.

Optionally, "symbol" refers to "OFDM symbol".

Optionally, in one slot, OFDM symbol numbers may start from 0. For example, for a normal CP, a set of OFDM symbol numbers in one slot may be $\{0, 1, \ldots, 13\}$. For another example, for an extended CP, a set of OFDM symbol numbers in one slot may be $\{0, 1, \ldots, 11\}$.

Optionally, the resource block may refer to a virtual resource block (VRB), or may refer to a physical resource block (PRB), or may refer to a common resource block (CRB), or may refer to a resource block defined in other manner.

Optionally, in one resource block, subcarrier numbers may start from 0. For example, a set of subcarrier numbers in one resource block may be $\{0, 1, \ldots, 11\}$.

In communication based on device to device (D2D) technology, an interface between devices (also referred to as user equipment (UE)) may be referred to as a PC5 interface. A corresponding transmission link on a physical layer may be referred to as a "direct link" or "sidelink" (SL for short) so as to be distinguished from an uplink (UL for short) and a downlink (DL for short). Communication based on an SL may be referred to as sidelink (SL) communication. An SL based on LTE technology may be referred to as an LTE SL. An SL based on NR technology may be referred to as an NR SL. 5G V2X communication may be based on an LTE SL or an NR SL. Hereinafter, "SL" refers to an NR SL unless otherwise specified.

A physical layer of an SL interface can support transmissions in one or more modes, such as broadcast transmission, groupcast transmission, unicast transmission, and the like, in one or more of in-coverage, out-of-coverage, and partial-coverage scenarios.

For frequency range 1 (FR1), a subcarrier spacing (SCS, denoted as $\Delta f$, in units of kHz) corresponding to the SL may be 15 kHz (normal CP), or 30 kHz (normal CP), or 60 kHz (normal CP or extended CP). For frequency range 2 (FR2), an SCS corresponding to the SL may be 60 kHz (normal CP or extended CP), or 120 kHz (normal CP). Each SCS corresponds to one SCS configuration (denoted as $\mu$). For example, $\Delta f=15$ kHz corresponds to $\mu=0$, $\Delta f=30$ kHz corresponds to $\mu=1$, $\Delta f=60$ kHz corresponds to $\mu=2$, $\Delta f=120$ kHz corresponds to $\mu=3$, and so on. For another example, for any given $\mu$, $\Delta f=2^{\mu} \cdot 15$ kHz. $\mu$ may be an SCS configuration of an SL carrier. For example, all SL transmissions in one SL carrier use the same SCS configuration and/or the same CP. $\mu$ may be an SCS configuration of a sidelink bandwidth part (SL BWP, or referred to as S-BWP, or referred to as SBWP, or referred to as SL-BWP, or referred to as BWP-SL, or referred to as BWP for short). For example, all SL transmissions in one SL BWP use the same SCS configuration and/or the same CP. μ may be an SCS configuration of a resource pool. For example, all SL transmissions in one resource pool use the same SCS configuration and/or the same CP.

Signals and channels related to an SL operation may include:
- an SL PSS (sidelink primary synchronization signal), or referred to as an S-PSS, or referred to as an SPSS, or referred to as an SL-PSS, or referred to as a PSS-SL, or referred to as a PSSS (primary sidelink synchronization signal), or the like;
- an SL SSS (sidelink secondary synchronization signal), or referred to as an S-SSS, or referred to as an SSSS (sidelink secondary synchronization signal), or referred to as an SL-SSS, or referred to as an SSS-SL, or referred to as an SSSS (secondary sidelink synchronization signal), or the like;
- a PSBCH (physical sidelink broadcast channel);
- a PSCCH (physical sidelink control channel);
- a PSSCH (physical sidelink shared channel); and
- a PSFCH (physical sidelink feedback channel).

The SL PSS, the SL SSS, and the PSBCH may be organized together into a block on a time/frequency resource. The block is referred to as, for example, an S-SSB (sidelink synchronization signal/PSBCH block, or SSS/PSBCH block), or is referred to as an SSS/PSBCH block, or is referred to as an SS/PSBCH block, or is referred to as an S-SS/PSBCH block, or is referred to as an SL SSB, or is referred to as an SSSB, or is referred to as an SL-SSB, or is referred to as an SSB-SL. A transmission bandwidth (for example, 11 resource blocks) of the S-SSB may be located in a corresponding SL carrier (for example, located in one SL BWP configured in the SL carrier). The SL PSS and/or the SL SSS may carry an SL SSID (sidelink synchronization identity, or sidelink synchronization identifier, or sidelink synchronization signal identity, or sidelink synchronization signal identifier, or referred to as SL-SSID, or referred to as SSID-SL, or referred to as SLSSID, or referred to as SLSS ID, or referred to as S-SSID, or the like), and the PSBCH may carry an SL MIB (sidelink master information block, or referred to as SL-MIB, or referred to as S-MIB, or referred to as MIB-SL). The SL MIB may include configuration information of the SL, such as information related to a direct frame number (or referred to as a frame number) or a direct half frame number (or referred to as a half frame number) or a direct subframe number (or referred to as a subframe number) or a direct slot number (or referred to as a slot number) where a PSBCH (or a corresponding S-SSB) carrying the SL MIB is located.

On the SL, a time-domain resource and/or a frequency-domain resource used to transmit the S-SSB may be configured by means of higher-layer parameter(s). For example, in the frequency domain, a location of the S-SSB in the frequency domain may be configured by means of a parameter absoluteFrequencySSB-SL (or a parameter si-AbsoluteFrequencySSB-r16). For another example, in the time domain, one or more synchronization configuration items may be configured by means of a parameter sl-SyncConfigList-r16. In each synchronization configuration item, $N_{period}^{S\text{-}SSB}$ S-SSBs within an S-SSB period having a length of 16 frames can be configured by means of a parameter numSSBwithinPeriod-SL (or a parameter sl-NumSSB-WithinPeriod-r16). An index of a slot where an S-SSB having a number (or an index) of $i_{S\text{-}SSB}$ ($0 \leq i_{S\text{-}SSB} \leq N_{period}^{S\text{-}SSB}-1$) is located in the period having a length of 16 frames may be $N_{offset}^{S\text{-}SSB}+N_{interval}^{S\text{-}SSB} \cdot i_{S\text{-}SSB}$, wherein $N_{offset}^{S\text{-}SSB}$ may be configured by means of a parameter timeOffsetSSB-SL (or a parameter sl-TimeOffsetSSB-r16), and $N_{interval}^{S\text{-}SSB}$ may be configured by means of a parameter timeIntervalSSB-SL (or a parameter sl-TimeInterval-r16).

Sometimes, it may be considered that the time-domain resource and/or the frequency-domain resource configured for the S-SSB in the SL carrier corresponds to a candidate S-SSB (or referred to as an S-SSB candidate). On a time-domain resource and/or a frequency-domain resource corresponding to one candidate S-SSB, one or more S-SSB transmissions (for example, respectively from different UEs) may exist at the same time, or no S-SSB transmission may exist.

Sometimes, a slot configured with an S-SSB (or configured with an S-SSB resource, or configured with a candidate S-SSB, or configured with a candidate S-SSB resource) may also be referred to as a slot configured with an SLSS (or configured with an SLSS resource), and vice versa.

A synchronization source (or referred to as a synchronization reference, or referred to as a synchronization reference source) related to SL synchronization may include a GNSS (global navigation satellite system, a gNB, an eNB, and UE (for example, NR UE, or LTE UE, or NR UE or LTE UE). UE serving as a synchronization source (for example, UE transmitting the S-SSB) may be referred to as SyncRef UE.

Examples of the GNSS may include the GPS (Global Positioning System), the GLONASS (GLObal NAvigation Satellite System), the BeiDou (Beidou Navigation Satellite System), the Galileo (Galileo Navigation Satellite System), the QZSS (Quasi-Zenith Satellite System), etc.

One or more (for example, one) SL BWPs may be configured in the SL carrier. In each SL BWP, a starting symbol for SL transmission in a slot supporting SL transmission may be configured by means of a parameter startSLsymbols (or a parameter sl-StartSymbol-r16) (for example, the symbol is numbered as $l_{start}^{SL}$ in the slot), and the number of symbols for SL transmission in the slot may be configured by means of a parameter lengthSLsymbols (or a parameter sl-LengthSymbols-r16) (for example, the number of symbols is denoted as $N_{length}^{SL}$). A value set of $l_{start}^{SL}$ may be denoted as $S_{start}^{SL}$, for example, $S_{start}^{SL}=\{0, 1, 2, 3, 4, 5, 6, 7\}$ A value set of $N_{start}^{SL}$ may be denoted as $S_{start}^{SL}$, for example, $S_{start}^{SL}=\{7, 8, 9, 10, 11, 12, 13, 14\}$. A "symbol for SL transmission" may be referred to as an "SL symbol". If a set of SL symbols (in chronological order) in the slot is denoted as $\{1_1^{SL}, 1_2^{SL}, \ldots, 1_{N_{length}^{SL}}^{SL}\}$, then $1_1^{SL}=l_{start}^{SL}$, $1_2^{SL}=l_{start}^{SL}+1, \ldots, 1_{N_{length}^{SL}}^{SL}=l_{start}^{SL}+N_{length}^{SL}-1\}$. For example, if $l_{start}^{SL}=7$, $N_{length}^{SL}=7$, then the set of SL symbols in the slot is $\{7, 8, 9, 10, 11, 12, 13\}$.

SL transmission can be performed only in a slot meeting a certain condition. For example, at least a symbol $l_{start}^{SL}$, a symbol $l_{start}^{SL}+1, \ldots$, and a symbol $l_{start}^{SL}+N_{length}^{SL}-1$ in the slot are uplink symbols (for example, semi-statically configured uplink symbols). For another example, the slot needs to be in a slot set of a configured resource pool.

One or more resource pools may be configured in one SL BWP, and in each resource pool,
- in the frequency domain, a location of a starting resource block of a starting sub-channel of the resource pool in the SL BWP may be configured by means of a parameter startRB-Subchannel (or a parameter sl-StartRB-Subchannel-r16).
- In the frequency domain, the number (denoted as $N_{subChannel}^{SL}$) of sub-channels occupied by the resource pool may be configured by means of a parameter numSubchannel (or a parameter sl-NumSubchannel-r16). The $N_{subChannel}^{SL}$ sub-channels may be consecutive in the frequency domain.

In the frequency domain, each sub-channel may consist of one or more resource blocks, and the specific number of resource blocks (referred to as a size of the sub-channel, for example, denoted as $n_{subChannelSize}$) may be configured by means of a parameter subchannelsize (or a parameter sl-SubchannelSize-r16). The $n_{subChannelSize}$ resource blocks may be consecutive in the frequency domain.

In the frequency domain, in an order from a low frequency to a high frequency, all sub-channels in one resource pool may be respectively numbered as 0, 1, . . . , $NN_{subChannel}^{SL}-1$. A sub-channel numbered as i may be referred to as "sub-channel i" ($0 \le i \le N_{subChannel}^{SL}-1$).

In the time domain, one or more slots available for the resource pool (or belonging to the resource pool) and appearing periodically may be configured by means of a parameter timeresourcepool (or a parameter sl-TimeResource-r16) (for example, by means of a slot bitmap). A size of the period may be a predefined value, or may be configured by means of a parameter periodResourcePool (or a parameter sl-Period-r16).

Methods for allocating resources (such as time-domain resources, or frequency-domain resources, or code-domain resources) related to the SL operation may be classified as follows:

Mode 1: a base station schedules SL resources for SL transmission.

Mode 2: UE determines the SL resources for SL transmission (that is, the base station does not participate in scheduling of the SL resources). For example, UE performing an SL transmission operation autonomously determines the SL resources for the SL transmission.

The UE may schedule data transmission by means of sidelink control information (SCI). The SL operation may support "two-stage SCI." $1^{st}$-stage SCI may include information such as resource reservation and/or resource allocation, so that all UEs monitoring the SL may perform sensing with respect to a resource reservation and/or resource allocation status. $2^{nd}$-stage SCI may include other information, such as information related to HARQ feedback and the like. Hereinafter, unless otherwise specified, when mentioned individually, "SCI" may include only the $1^{st}$-stage SCI, or may include only the $2^{nd}$-stage SCI, or may include both the $1^{st}$-stage SCI and the 2nd-stage SCI.

A format of the $1^{st}$-stage SCI may be SCI format 0-1 (or written as "SCI format 0_1"). The following are some examples of the information that can be included in the SCI format 0-1:
priority;
frequency resource assignment;
time resource assignment;
a resource reservation period; and
DMRS pattern.
a $2^{nd}$-stage SCI format.

A format of the $2^{nd}$-stage SCI may be SCI format 0-2 (or written as "SCI format 0_2"). The following are some examples of the information that can be included in the SCI format 0-2:

a source layer-1 identifier (source layer-1 ID, or referred to as layer-1 source ID, or referred to as physical layer source ID, or referred to as source ID (when the context is clear));
a destination layer-1 identifier (destination layer-1 ID, or referred to as layer-1 destination ID, or referred to as physical layer destination ID, or referred to as destination ID (when the context is clear));
an HARQ process identifier (HARQ process ID), or an HARQ process number;
a new data indicator (NDI); and
a redundancy version (RV).

The $1^{st}$-stage SCI may be carried on a PSCCH. The $2^{nd}$-stage SCI may be multiplexed, together with data to be transmitted, on a PSSCH associated with (or scheduled by) the PSCCH. The PSCCH and the PSSCH associated therewith may be multiplexed, in a certain manner, on the time-domain resource and/or the frequency-domain resource allocated for SL transmission (for example, a sub-channel where a starting resource block of the PSCCH is located is a starting sub-channel of the PSSCH associated therewith. For another example, the starting resource block of the PSCCH is a starting resource block of the starting sub-channel of the PSSCH associated therewith). In addition, it may be considered that the $1^{st}$-stage SCI and/or the corresponding $2^{nd}$-stage SCI schedules the PSSCH (or schedules transmission of the PSSCH, or schedules transmission of a TB carried on the PSSCH).

For a particular SL transmission including a PSCCH and/or a PSSCH, a transmitter may be referred to as TX UE, and a receiver may be referred to as RX UE. If the SL transmission is a groupcast transmission, or a unicast transmission, and if HARQ feedback is enabled, the PSFCH transmitted by the RX UE may carry feedback on the PSCCH and/or PSSCH transmitted by the TX UE, wherein the feedback may be referred to as "HARQ-ACK information". In some configurations, the HARQ-ACK information may be a positive acknowledgment (ACK), or a negative acknowledgment (NACK, or NAK). In some other configurations, the HARQ-ACK information may include only NACK.

In the time domain, PSFCH resources may appear periodically in a resource pool. For example, a corresponding period (referred to as, for example, "PSFCH period" or "PSFCH resource period," denoted as, for example, $N_{PSSCH}^{PSFCH}$, and in units of, for example, the number of slots) may be configured by means of a parameter period-PSFCHresource (or a parameter sl-PSFCH-Period-r16) (for example, $N_{PSSCH}^{PSFCH}=1$, or $N_{PSSCH}^{PSFCH}=2$, or $N_{PSSCH}^{PSFCH}=4$). $N_{PSSCH}^{PSFCH}=0$ may be used to indicate that no PSFCH resource is configured in a corresponding resource pool, and/or to indicate that HARQ feedback in the corresponding resource pool is disabled. For example, if a resource pool has not been configured with any PSFCH-related parameter (such as a parameter configured by means of sl-PSFCH-Config-r16), or if a PSFCH period configured in the parameter sl-PSFCH-Config-r16 is 0 slots, then it is indicated that the resource pool has not been configured with any PSFCH resource. Optionally, if a resource pool has been configured with the parameter sl-PSFCH-Config-r16, and if the PSFCH period configured in the parameter sl-PSFCH-Config-r16 is greater than 0 slots, then it is indicated that the resource pool has been configured with PSFCH resources.

Slots related to the PSFCH period may be "logical slots," that is, only slots belonging to a corresponding resource pool are included. For example, if slot 0 and slot 5 in a certain frame belong to time-domain resources of a certain resource pool, and if slots 1, 2, 3, and 4 do not belong to the time-domain resources of this resource pool, then slot 0 and slot 5 are two adjacent "logical slots" in the resource pool, and are respectively numbered as, for example, $t_q^{SL}$ and $t_{q+1}^{SL}$. In this example, if sl-PSFCH-Period-r16=1, then it is indicated that PSFCH resources are present in slot 0 and slot 5.

In the frequency domain, PSFCH resources may be configured to be in one RB set (for example, a set of consecutive PRBs, or a set of partially or completely inconsecutive PRBs). For example, it is configured by means of a parameter sl-PSFCH-RB-Set.

Embodiment 1

A method performed by user equipment according to Embodiment 1 of the present invention will be described below with reference to FIG. 1.

FIG. 1 is a flowchart showing a method performed by user equipment according to Embodiment 1 of the present invention.

As shown in FIG. 1, in Embodiment 1 of the present invention, the steps performed by the user equipment (UE) include: step S101 and step S103.

Specifically, in step S101, resource pool-related information is acquired. wherein:
- Optionally, part of or the entirety of the "resource pool-related information" is predefined information.
- Optionally, part of or the entirety of the "resource pool-related information" is configuration information.
- Optionally, part of or the entirety of the "resource pool-related information" is pre-configuration information.
- Optionally, part of or the entirety of the "resource pool-related information" is indication information.
- Optionally, the "resource pool-related information" may include one or more of the following:
  - SL subcarrier spacing configuration (SCS configuration) u, wherein:
    - Optionally, μ is a subcarrier spacing configuration configured or pre-configured for the resource pool.
    - Optionally, μ is a subcarrier spacing configuration of an SL BWP where the resource pool is located.
    - Optionally, μ is a subcarrier spacing configuration of an SL carrier where an SL BWP where the resource pool is located is located.
    - Optionally, μ is a subcarrier spacing configuration of an SL carrier where the resource pool is located.
    - Optionally, each value of μ corresponds to the value of one subcarrier spacing (SCS) (denoted as ΔJ). For example, μ=0 corresponds to Δf=15 kHz. For another example, μ=1 corresponds to Δf=30 kHz. For another example, μ=2 corresponds to Δf=60 kHz. For another example, μ=3 corresponds to Δf=120 kHz. For another example, μ=4 corresponds to Δf=240 kHz. For another example, for any given μ, $\Delta f = 2^\mu \cdot 15$ kHz.
  - Duplex mode and/or TDD configuration information, wherein:
    - Optionally, the duplex mode may be a duplex mode of the resource pool, or a duplex mode of the SL BWP where the resource pool is located, or a duplex mode of the SL carrier where the resource pool is located, or a duplex mode of a cell where the SL carrier where the resource pool is located is located, or a duplex mode corresponding to SL transmission on the resource pool, or a duplex mode of a carrier where the SL transmission on the resource pool is located, or a duplex mode of a cell where the carrier where the SL transmission on the resource pool is located is located, wherein:
      - Optionally, the duplex mode may be "TDD." For example, the SL carrier where the resource pool is located corresponds to a non-SUL carrier of a TDD cell. For another example, the SL carrier where the SL transmission on the resource pool is located corresponds to a non-SUL carrier of a TDD cell.
      - Optionally, the duplex mode may be "FDD." For example, the SL carrier where the resource pool is located corresponds to a UL carrier of an FDD cell. For another example, the SL carrier where the SL transmission on the resource pool is located corresponds to a UL carrier of an FDD cell.
      - Optionally, the duplex mode may be "SUL." For example, the SL carrier where the resource pool is located corresponds to an SUL carrier of a TDD cell. For another example, the SL carrier where the SL transmission on the resource pool is located corresponds to an SUL carrier of a TDD cell.
    - Optionally, the TDD configuration information may indicate one TDD pattern (referred to as "pattern 1") or two TDD patterns (respectively referred to as "pattern 1" and "pattern 2"), wherein
      - Optionally, each TDD pattern may be defined by one or more of the following:
        - A period (denoted as, for example, dl-UL-TransmissionPeriodicity), in units of, for example, milliseconds.
        - The number of full downlink (DL) slots (denoted as, for example, nrofDownlinkSlots), wherein the "full downlink slot" refers to a slot in which all symbols are downlink symbols (or a slot having only downlink symbols).
        - The number of downlink symbols (denoted as, for example, nrofDownlinkSymbols).
        - The number of full uplink (UL) slots (denoted as, for example, nrofUplinkSlots), wherein the "full uplink slot" refers to a slot in which all symbols are uplink symbols (or a slot having only uplink symbols).
        - The number of uplink symbols (denoted as, for example, nrofUplinkSymbols).
      - Optionally, if a period corresponding to the TDD configuration information is denoted as $T_{Period}^{TDD}$ (in units of, for example, milliseconds), a period corresponding to pattern 1 is P, and a period corresponding to pattern 2 (if configured) is $P_2$, then
        - Optionally, if pattern 1 has been configured, and if pattern 2 has not been configured, then $T_{Period}^{TDD}=P$.
        - Optionally, if pattern 1 has been configured, and if pattern 2 has been configured, then $T_{Period}^{TDD}=P+P_2$.
    - Optionally, the TDD configuration information may be configured or pre-configured by means of higher-layer parameter(s), wherein:
      - Optionally, the TDD configuration information may be pre-configured by means of higher-layer parameter(s) (for example, sl-TDD-Config-r16 in SL-PreconfigGeneral-r16 in SL-PreconfigurationNR-r16).

Optionally, the TDD configuration information may be indicated by a message transmitted on the SL. For example, the TDD configuration information is indicated by means of a parameter sl-TDD-Config-r16 in a MasterInformationBlockSidelink message. For example, the parameter sl-TDD-Config-r16 in the MasterInformationBlockSidelink message may indicate one or more of the following:

a pattern (denoted as, for example, patterns). For example, patterns may indicate that pattern 1 has been configured and pattern 2 has not been configured. For another example, patterns may indicate that pattern 1 has been configured and pattern 2 has been configured. Optionally, a special value of patterns (for example, 0, indicating that pattern 1 has not been configured and pattern 2 has not been configured) may indicate that the duplex mode is "FDD or SUL."

a period (denoted as, for example, periods). For example, if patterns indicates that pattern 1 has been configured and pattern 2 has not been configured, then periods indicates the period P corresponding to pattern 1. If patterns indicates that pattern 1 has been configured and pattern 2 has been configured, then periods indicates the period P of pattern 1 and the period $P_2$ of pattern 2 (for example, part of bits of periods indicate the period P of pattern 1, and remainder of the bits of periods indicate the period $P_2$ of pattern 2. For another example, the value of periods indicates both the period P of pattern 1 and the period $P_2$ of pattern 2. For another example, periods indicates the period P of pattern 1 plus the period $P_2$ of pattern 2). Optionally, a special value (for example, 0) of periods may indicate that the duplex mode is "FDD or SUL."

Quasi-uplink slot information (for example, the number of quasi-uplink slots, denoted as, for example, nrofQuasiUplinkSlots). For example, if patterns indicates that pattern 1 has been configured and pattern 2 has not been configured, then nrofQuasiUplinkSlots indicates the number of quasi-uplink slots of pattern 1 (denoted as, for example, $N_{nrofQuasiUplinkSlots}^{pattern1}$). For another example, if patterns indicates that pattern 1 has been configured and pattern 2 has been configured, then nrofQuasiUplinkSlots indicates the number $N_{nrofQuasiUplinkSlots}^{pattern1}$ of quasi-uplink slots of pattern 1 and the number (denoted as, for example, $N_{nrofQuasiUplinkSlots}^{pattern2}$) of quasi-uplink slots of pattern 2. For example, part of bits of nrofQuasiUplinkSlots indicate the number $N_{nrofQuasiUplinkSlots}^{pattern1}$ of quasi-uplink slots of pattern 1, and the remainder of the bits of nrofQuasiUplinkSlots indicate the number $N_{nrofQuasiUplinkSlots}^{pattern2}$ of quasi-uplink slots of pattern 2. For another example, the value of nrofQuasiUplinkSlots indicates both the number $N_{nrofQuasiUplinkSlots}^{pattern1}$ of quasi-uplink slots of pattern 1 and the number $N_{nrofQuasiUplinkSlots}^{pattern2}$ of quasi-uplink slots of pattern 2. For another example, if patterns indicates that pattern 1 has been configured and pattern 2 has been configured, then nrofQuasiUplinkSlots indicates the sum of the number $N_{nrofQuasiUplinkSlots}^{pattern1}$ of quasi-uplink slots of pattern 1 and the number $N_{nrofQuasiUplinkSlots}^{pattern2}$ of quasi-uplink slots of pattern 2. Optionally, a special value (for example, 0, or a value in which all bits are 1) of nrofQuasiUplinkSlots may indicate that the duplex mode is "FDD or SUL."

Optionally, the TDD configuration information may be indicated by a message transmitted on the DL. For example, the TDD configuration information is indicated by a parameter tdd-UL-DL-ConfigurationCommon in a parameter servingCellConfigCommon in an SIB1 message broadcast (or transmitted by other means) by a serving cell (for example, a PCell). For example, the parameter tdd-UL-DL-ConfigurationCommon may indicate one or more of the following:

A reference subcarrier spacing (denoted as, for example, referenceSubcarrierSpacing, or $\mu_{ref}$).

A configuration (denoted as, for example, pattern1) of pattern 1, wherein the number of full downlink slots, the number of downlink symbols, the number of full uplink slots, and the number of uplink symbols of pattern1 may be respectively denoted as $d_{slots}$, $d_{sym}$, $u_{slots}$, and $u_{sym}$.

A configuration (denoted as, for example, pattern2) of pattern 2, wherein the number of full downlink slots, the number of downlink symbols, the number of full uplink slots, and the number of uplink symbols of pattern2 may be respectively denoted as $d_{slots,2}$, $d_{sym,2}$, $u_{slots,2}$, and $u_{sym,2}$.

Optionally, the duplex mode may be related to the TDD configuration information, or may be related to higher-layer parameter(s) corresponding to the TDD configuration information, wherein:

Optionally, if the higher-layer parameter(s) corresponding to the TDD configuration information has been configured, then the duplex mode is "TDD" or "SUL." In this case, optionally, if it is determined that the SUL has been configured (for example, a parameter supplementaryUplink has been configured, or the value of a parameter tddOrSUL for distinguishing between "TDD" and "SUL" corresponds to "SUL"), then the duplex mode is "SUL", otherwise the duplex mode is "TDD."

Optionally, if the higher-layer parameter(s) corresponding to the TDD configuration information has not been configured, then the duplex mode is "FDD."

Optionally, if the higher-layer parameter(s) corresponding to the TDD configuration information has not been configured, then the duplex mode is "SUL."

Optionally, if the higher-layer parameter(s) corresponding to the TDD configuration information has not been configured, then the duplex mode is "FDD" or "SUL." In this case, optionally, if it is determined that the SUL has been configured (for example, the parameter supplementary Uplink has been configured, or the value of a parameter fddOrSUL for distinguishing between "FDD" and "SUL" corresponds to "SUL"), then the duplex mode is "SUL", otherwise the duplex mode is "FDD."

Optionally, a partial value of the higher-layer parameter(s) corresponding to the TDD configuration information indicates that the duplex mode is "TDD".

Optionally, a partial value of the higher-layer parameter(s) corresponding to the TDD configuration information indicates that the duplex mode is "FDD".

Optionally, a partial value of the higher-layer parameter(s) corresponding to the TDD configuration information indicates that the duplex mode is "SUL".

Optionally, a partial value of the higher-layer parameter(s) corresponding to the TDD configuration information indicates that the duplex mode is "FDD" or "SUL".

Optionally, a partial value of the higher-layer parameter(s) corresponding to the TDD configuration information indicates that the duplex mode is "TDD" or "SUL".

A time-domain resource period (denoted as $T_{Period}^{SL}$, in units of, for example, milliseconds), wherein:

Optionally, $T_{Period}^{SL}$ may be a predefined value. For example, $T_{Period}^{SL}$=10240 milliseconds. For another example, $T_{Period}^{SL}$=160 milliseconds. For another example, $T_{Period}^{SL}$=20 milliseconds. For another example, $T_{Period}^{SL}$=0.5 milliseconds. For another example, $T_{Period}^{SL}$=0.625 milliseconds. For another example, $T_{Period}^{SL}$=1 millisecond. For another example, $T_{Period}^{SL}$=1.25 milliseconds. For another example, $T_{Period}^{SL}$=2 milliseconds. For another example, $T_{Period}^{SL}$=2.5 milliseconds. For another example, $T_{Period}^{SL}$=5 milliseconds. For another example, $T_{Period}^{SL}$=10 milliseconds. For another example, $T_{Period}^{SL}$=3 milliseconds. For another example, $T_{Period}^{SL}$=4 milliseconds.

Optionally, $T_{Period}^{SL}$ may be configured or pre-configured by means of higher-layer parameter(s) (for example, sl-Period-r16).

Optionally, $T_{Period}^{SL}=C_{Period,0} \cdot T_{Period}^{TDD}$, wherein

Optionally, $C_{Period,0}$ is a predefined constant. For example, $C_{Period,0}$=1, or $C_{Period,0}$=2, or $C_{Period,0}$=4, or $C_{Period,0}$=5, or $C_{Period,0}$=6, or $C_{Period,0}$=8, or $C_{Period,0}$=10, or $C_{Period,0}$=20, or $C_{Period,0}$=40, or $C_{Period,0}$=60, or $C_{Period,0}$=80, or $C_{Period,0}$=100.

Optionally, the value of $C_{Period}$ is related to µ.

Optionally, $C_{Period}$ may be configured or pre-configured by means of higher-layer parameter(s).

Optionally, $T_{Period}^{SL}$ may be indicated by means of DCI or SCI.

Optionally, a slot number set in the time-domain resource period $T_{Period}^{SL}$ is $\{0, 1, \ldots, T_{Period}^{SL} \cdot N_{slot}^{subframe,\mu}-1\}$. For example, if $T_{Period}^{SL}$=10240 milliseconds, then a slot number in the time-domain resource period $T_{Period}^{SL}$ is equal to a slot number in a reference frame number period (10240 milliseconds). That is, slots in the time-domain resource period $T_{Period}^{SL}$ are numbered relative to slot 0 of a radio frame corresponding to reference frame number 0 (that is, slot 0 in the time-domain resource period $T_{Period}^{SL}$ is slot 0 of the radio frame corresponding to reference frame number 0), and respective numbers of the slots are 0, 1, . . . , 10239 in chronological order. For another example, if $T_{Period}^{SL}$=160 milliseconds, and if $N_{slot}^{subframe,\mu}$=1, then in each time-domain resource period $T_{Period}^{SL}$ within a reference frame number period, respective numbers of slots are 0, 1, . . . , 159 in chronological order.

Optionally, the slot number set in the time-domain resource period $T_{Period}^{SL}$ is $\{n \cdot T_{Period}^{SL} \cdot N_{slot}^{subframe,\mu}, n \cdot T_{Period}^{SL} \cdot N_{slot}^{subframe,\mu}+1, \ldots, n \cdot T_{Period}^{SL} \cdot N_{slot}^{subframe,\mu}+T_{Period}^{SL} \cdot N_{slot}^{subframe,\mu}-1\}$, wherein n is an integer, and $$0 \le n < \frac{10240}{T_{Period}^{SL}} \left( \text{or } 0 \le n \le \frac{10240}{T_{Period}^{SL}} - 1 \right)$$

For example, if $T_{Period}^{SL}$=160 milliseconds, and if $N_{slot}^{subframe,\mu}$=1, then slot numbers are respectively 0, 1, . . . , 159 in chronological order in the first time-domain resource period (corresponding to n=0) within a reference frame number period (10240 milliseconds), slot numbers are respectively 160, 161, . . . , 319 in chronological order in the second time-domain resource period (corresponding to n=1), . . . , and slot numbers are respectively 10080, 10081, . . . , 10239 in chronological order in the 64th time-domain resource period (corresponding to n=63). Slots in the first time-domain resource period are numbered relative to slot 0 of the radio frame corresponding to reference frame number 0 (that is, slot 0 in the first time-domain resource period is slot 0 of the radio frame corresponding to reference frame number 0).

Time-domain resource indication. For example, the time-domain resource indication may be a bitmap having a length of $L_{bitmap}$ (denoted as, for example, $B=(b_0, b_1, \ldots, b_{L_{bitmap}-1})$), wherein Optionally, any one of $b_0, b_1, \ldots, b_{L_{bitmap}-1}$ corresponds to one bit (a corresponding value set is $\{0, 1\}$).

Optionally, $b_0$ is the most significant bit (MSB) of the bitmap, and correspondingly, $b_{L_{bitmap}-1}$ is the least significant bit (LSB) of the bitmap.

Optionally, $b_0$ is the least significant bit (LSB) of the bitmap, and correspondingly, $b_{L_{bitmap}-1}$ is the most significant bit (MSB) of the bitmap.

Optionally, the bitmap may be configured or pre-configured by means of higher-layer parameter(s) (for example, sl-TimeResource-r16, or referred to as sl-SlotBitmap-r16). For example, the parameter sl-TimeResource-r16 may be a bit string having a length of $N_{TimeResource}$, wherein:

Optionally, $N_{TimeResource}$ is a predefined constant. For example, $N_{TimeResource}$=160, or $N_{TimeResource}$=200, or $N_{TimeResource}$=100, or $N_{TimeResource}$=120.

Optionally, the value of $N_{TimeResource}$ is related to µ. For example, if µ=0, then $N_{TimeResource}$=20. If µ=1, then $N_{TimeResource}$=40. If µ=2, then $N_{TimeResource}$=80. If µ=3, then $N_{TimeResource}$=160. For another example, $N_{TimeResource}=C_{TimeResource,0} \cdot 2^{\mu}$, wherein $C_{TimeResource,0}$ is a predefined constant (for example, $C_{TimeResource,0}=10$, or $C_{TimeResource,0}=20$, or $C_{TimeResource,0}=40$, or $C_{TimeResource,0}=60$, or $C_{TimeResource,0}=80$, or $C_{TimeResource,0}=100$).

Optionally, the value of $N_{TimeResource}$ is related to the duplex mode. For example, if the duplex mode is "FDD" or "SUL", then $N_{TimeResource}=C_{TimeResource,1}$, and if the duplex mode is "TDD", then $N_{TimeResource}=C'_{TimeResource,1}$. $C_{TimeResource,1}$ is a predefined constant, and $C'_{TimeResource,1}$ is a predefined constant. Alternatively, the value of $C'_{TimeResource,1}$ is related to μ. For example, if μ=0, then $C'_{TimeResource,1}=20$. If μ=1, then $C'_{TimeResource,1}=40$. If μ=2, then $C'_{TimeResource,1}=80$. If μ=3, then $C'_{TimeResource,1}=160$. For another example, $C'_{TimeResource,1}=C'_{TimeResource,1,0}\cdot 2^{\mu}$, wherein $C'_{TimeResource,1,0}$ is a predefined constant (for example $C'_{TimeResource,1,0}=10$, or $C'_{TimeResource,1,0}=20$, or $C'_{TimeResource,1,0}=40$, or $C'_{TimeResource,1,0}=60$, or $C'_{TimeResource,1,0}=80$, or $C'_{TimeResource,1,0}=100$).

Optionally, bits corresponding to the value of the parameter sl-TimeResource-r16 are respectively $p_0, p_1, \ldots, p_{N_{TimeResource}-1}$ from the most significant bit (MSB) to the least significant bit (LSB). In this case, optionally, $p_0, p_1, p_{L_{bitmap}-1}$ can be referred to as $L_{bitmap}$ most significant bits of the parameter sl-TimeResource-r16, and $p_{N_{TimeResource}-L_{bitmap}}, p_{N_{TimeResource}+L_{bitmap}}, \ldots, p_{N_{TimeResource}-1}$ can be referred to as $L_{bitmap}$ least significant bits of the parameter sl-TimeResource-r16.

Optionally, bits corresponding to the value of the parameter sl-TimeResource-r16 are respectively $p_0, p_1, \ldots, p_{N_{TimeResource}-1}$ from the least significant bit (LSB) to the most significant bit (MSB). In this case, optionally, $p_0, p_1, \ldots, p_{L_{bitmap}-1}$ can be referred to as $L_{bitmap}$ least significant bits of the parameter sl-TimeResource-r16, and $p_{N_{TimeResource}-L_{bitmap}}, p_{N_{TimeResource}-L_{bitmap}+1}, \ldots, p_{N_{TimeResource}-1}$ can be referred to as $L_{bitmap}$ most significant bits of the parameter sl-TimeResource-r16.

S-SSB-related information. For example, time-domain configuration information (for example, the number $N_{period}^{S-SSB}$ of S-SSBs in an S-SSB period of 16 frames configured by means of a parameter sl-NumSSB-WithinPeriod-r16, an offset $N_{offset}^{S-SSB}$ within the S-SSB period configured by means of a parameter sl-TimeOffsetSSB-r16, and a spacing $N_{interval}^{S-SSB}$ between two adjacent S-SSBs configured by means of a parameter sl-TimeInterval-r16) of an S-SSB included in each of one or more synchronization configuration items is configured by means of a parameter sl-SyncConfigList-r16.

In addition, in step S103, a slot set (denoted as $S_{RP}=(t_0^{SL}, t_1^{SL}, \ldots, t_{T_{max}^{SL}}^{SL})$) in the resource pool is determined, wherein:

Optionally, the "slot set in the resource pool" may be referred to as a "slot pool" of the resource pool.

Optionally, $t_i^{SL}$ ($0 \leq i \leq T_{max}^{SL}$) is a slot number in the time-domain resource period $T_{Period}^{SL}$, wherein:

Optionally, $t_0^{SL}, t_1^{SL}, \ldots, t_{T_{max}}^{SL}$ are arranged in chronological order.

Optionally, $t_0^{SL}, t_1^{SL}, \ldots, t_{T_{max}}^{SL}$ are arranged in ascending order of slot numbers.

Optionally, $t_0^{SL} < t_1^{SL} < \ldots < t_{T_{max}}^{SL}$.

Optionally, the "determining a slot set in the resource pool" may include one or more of the following steps (combined in any order where applicable):

Determine quasi-uplink slots in the TDD configuration period $T_{Period}^{TDD}$. For example, a determination is made as to which slot or slots are quasi-uplink slots within each TDD configuration period $T_{Period}^{TDD}$. The number of quasi-uplink slots determined is denoted as $N_{ULSlot}^{TDD}$.

Optionally, this step is performed when the duplex mode is "TDD".

Optionally, this step is performed only when the duplex mode is "TDD".

Optionally, when the duplex mode is not "TDD" (for example, when the duplex mode is "FDD", or when the duplex mode is "SUL", or when the duplex mode is "FDD" or "SUL"), $T_{Period}^{TDD}$ is a predefined constant, or is a configured or pre-configured value.

Optionally, when the duplex mode is not "TDD" (for example, when the duplex mode is "FDD", or when the duplex mode is "SUL", or when the duplex mode is "FDD" or "SUL"), $N_{ULSlot}^{TDD}$ is a predefined constant, or is a configured or pre-configured value.

Optionally, when the duplex mode is not "TDD" (for example, when the duplex mode is "FDD", or when the duplex mode is "SUL", or when the duplex mode is "FDD" or "SUL"), $N_{ULSlot}^{TDD}=T_{Period}^{TDD}\cdot N_{slot}^{subframe,\mu}$.

Optionally, when the duplex mode is "FDD", $T_{Period}^{TDD}$ is a predefined constant, or is a configured or pre-configured value.

Optionally, when the duplex mode is "FDD", $N_{ULSlot}^{TDD}$ is a predefined constant, or is a configured or pre-configured value.

Optionally, when the duplex mode is "FDD", $N_{ULSlot}^{TDD}=T_{Period}^{TDD}\cdot N_{slot}^{subframe,\mu}$.

Optionally, when the duplex mode is "SUL", $T_{Period}^{TDD}$ nod is a predefined constant, or is a configured or pre-configured value.

Optionally, when the duplex mode is "SUL", $N_{ULSlot}^{TDD}$ is a predefined constant, or is a configured or pre-configured value.

Optionally, when the duplex mode is "SUL", $N_{ULSlot}^{TDD}=T_{Period}^{TDD}\cdot N_{slot}^{subframe,\mu}$.

Optionally, if patterns indicates that pattern 1 has been configured and pattern 2 has not been configured, then it is determined that the "quasi-uplink slots in the TDD configuration period $T_{Period}^{TDD}$" are the last $N_{ULSlot,1}^{TDD}$ slots in the period P of pattern 1 indicated by periods, wherein $N_{ULSlot,1}^{TDD}=N_{nrofQuasiUplinkSlots}^{pattern1}$, and correspondingly, $N_{ULSlot}^{TDD}=N_{ULSlot,1}^{TDD}=N_{nrofQuasiUplinkSlots}^{pattern1}$.

Optionally, if patterns indicates that pattern 1 has been configured and pattern 2 has been configured, then it is determined that the "quasi-uplink slots in the TDD configuration period $T_{Period}^{TDD}$" include the following slots:

The last $N_{nrofQuasiUplinkSlots}^{pattern1}$ slots in the period P of pattern 1 indicated by periods.

The last $N_{nrofQuasiUplinkSlots}^{pattern2}$ slots in the period $P_2$ of pattern 2 indicated by periods.

Correspondingly, $N_{ULSlot}^{TDD} = N_{nrofQuasiUplinkSlots}^{pattern1} + N_{nrofQuasiUplinkSlots}^{pattern2}$ Optionally, if pattern1 has been configured and pattern2 has not been configured, then it is determined that the "quasi-uplink slots in the TDD configuration period $T_{Period}^{TDD}$" are the last $N_{ULSlot,1}^{TDD}$ slots in the period P of pattern 1 indicated by pattern1, wherein Optionally, $N_{ULSlot,1}^{TDD} = u_{slots} \cdot 2^{\mu-\mu_{ref}} + \left\lfloor \frac{(u_{sym} \cdot 2^{\mu-\mu_{ref}})}{N_{symb}^{slot}} \right\rfloor + N_{0,1}$, wherein Optionally, if $((u_{sym} \cdot 2^{\mu-\mu_{ref}}) \mod N_{symb}^{slot}) \geq N_{symb}^{slot} - l_{start}^{SL}$, then $N_{0,1} = 1$, otherwise $N_{0,1} = 0$. Optionally, if $((u_{sym} \cdot 2^{\mu-\mu_{ref}}) \mod N_{symb}^{slot}) \geq N_{length}^{SL}$, then $N_{0,1} = 1$, otherwise $N_{0,1} = 0$. Optionally, if $((u_{sym} \cdot 2^{\mu-\mu_{ref}}) \mod N_{symb}^{slot}) \geq N_{symb}^{slot} - l_{start}^{SL}$, and if $((u_{sym} \cdot 2^{\mu-\mu_{ref}}) \mod N_{symb}^{slot}) \geq N_{length}^{SL}$, then $N_{0,1} = 1$, otherwise $N_{0,1} = 0$. Optionally, $N_{0,1} = 1$. Optionally, $N_{0,1} = 0$. Optionally, $N_{ULSlot,1}^{TDD} = u_{slots} \cdot 2^{\mu-\mu_{ref}}$.

Optionally, if pattern1 has been configured and pattern2 has been configured, then it is determined that the "quasi-uplink slots in the TDD configuration period $T_{Period}^{TDD}$" include the following slots:

The last $N_{ULSlot,1}^{TDD}$ slots in the period P of pattern 1 indicated by pattern1, wherein Optionally, $N_{ULSlot,1}^{TDD} = u_{slots} \cdot 2^{\mu-\mu_{ref}} + \left\lfloor \frac{(u_{sym} \cdot 2^{\mu-\mu_{ref}})}{N_{symb}^{slot}} \right\rfloor + N_{0,1}$, wherein Optionally, if $((u_{sym} \cdot 2^{\mu-\mu_{ref}}) \mod N_{symb}^{slot}) \geq N_{symb}^{slot} - l_{start}^{SL}$, then $N_{0,1} = 1$, otherwise $N_{0,1} = 0$. Optionally, if $((u_{sym} \cdot 2^{\mu-\mu_{ref}}) \mod N_{symb}^{slot}) \geq N_{length}^{SL}$, then $N_{0,1} = 1$, otherwise $N_{0,1} = 0$. Optionally, if $((u_{sym} \cdot 2^{\mu-\mu_{ref}}) \mod N_{symb}^{slot}) \geq N_{symb}^{slot} - l_{start}^{SL}$, and if $((u_{sym} \cdot 2^{\mu-\mu_{ref}}) \mod N_{symb}^{slot}) \geq N_{length}^{SL}$, then $N_{0,1} = 1$, otherwise $N_{0,1} = 0$. Optionally, $N_{0,1} = 1$. Optionally, $N_{0,1} = 0$. Optionally, $N_{ULSlot,1}^{TDD} = u_{slots} \cdot 2^{\mu-\mu_{ref}}$.

The last $N_{ULSlot,2}^{TDD}$ slots in the period $P_2$ of pattern 2 indicated by pattern2, wherein Optionally, $N_{ULSlot,2}^{TDD} = u_{slots,2} \cdot 2^{\mu-\mu_{ref}} + \left\lfloor \frac{(u_{sym,2} \cdot 2^{\mu-\mu_{ref}})}{N_{symb}^{slot}} \right\rfloor + N_{0,2}$, wherein Optionally, if $((u_{sym,2} \cdot 2^{\mu-\mu_{ref}}) \mod N_{symb}^{slot}) \geq N_{symb}^{slot} - l_{start}^{SL}$, then $N_{0,2} = 1$, otherwise $N_{0,2} = 0$. Optionally, if $((u_{sym,2} \cdot 2^{\mu-\mu_{ref}}) \mod N_{symb}^{slot}) \geq N_{length}^{SL}$, then $N_{0,2} = 1$, otherwise $N_{0,2} = 0$. Optionally, if $((u_{sym,2} \cdot 2^{\mu-\mu_{ref}}) \mod N_{symb}^{slot}) \geq N_{symb}^{slot} - l_{start}^{SL}$, and if $((u_{sym,2} \cdot 2^{\mu-\mu_{ref}}) \mod N_{symb}^{slot}) \geq N_{length}^{SL}$, then $N_{0,2} = 1$, otherwise $N_{0,2} = 0$. Optionally, $N_{0,2} = 1$. Optionally, $N_{0,2} = 0$. Optionally, $N_{ULSlot,2}^{TDD} = u_{slots,2} \cdot 2^{\mu-\mu_{ref}}$.

Determine $L_{bitmap}$, wherein:
Optionally, $L_{bitmap}$ is a predefined constant. For example, $L_{bitmap}=10$, or $L_{bitmap}=20$, or $L_{bitmap}=40$, or $L_{bitmap}=60$, or $L_{bitmap}=80$, or $L_{bitmap}=100$, or $L_{bitmap}=120$, or $L_{bitmap}=140$, or $L_{bitmap}=160$.

Optionally, $L_{bitmap}=N_{TimeResource}$.

Optionally, $L_{bitmap}$ is a configured or pre-configured value.

Optionally, the value of $L_{bitmap}$ is related to $\mu$. For example, if $\mu=0$, then $L_{bitmap}=20$. If $\mu=1$, then $L_{bitmap}=40$. If $\mu=2$, then $L_{bitmap}=80$. If $\mu=3$, then $L_{bitmap}=160$. For another example, $L_{bitmap}=C_{bitmap,0} \cdot 2^{\mu}$, wherein $C_{bitmap,0}$ is a constant. For example, $C_{bitmap,0}=10$, or $C_{bitmap,0}=20$, or $C_{bitmap,0}=30$, or $C_{bitmap,0}=40$, or $C_{bitmap,0}=50$, or $C_{bitmap,0}=60$, or $C_{bitmap,0}=70$, or $C_{bitmap,0}=80$, or $C_{bitmap,0}=90$, or $C_{bitmap,0}=100$.

Optionally, the value of $L_{bitmap}$ is related to $N_{ULSlot}^{TDD}$. For example, $L_{bitmap}=C_{bitmap,1} \cdot N_{ULSlot}^{TDD}$, wherein Optionally, $C_{bitmap,1}$ is a constant. For example, $C_{bitmap,1}=1$, or $C_{bitmap,1}=5$, or $C_{bitmap,1}=10$, or $C_{bitmap,1}=20$.

Optionally, $C_{bitmap,1}$ is a configured or pre-configured value.

Optionally, $C_{bitmap,1}$ is the greatest integer satisfying $C_{bitmap,1} \cdot N_{ULSlot}^{TDD} \leq N_{TimeResource}$.

Optionally, $C_{bitmap,1}$ is the greatest integer satisfying $C_{bitmap,1} \cdot N_{ULSlot}^{TDD} < N_{TimeResource}$.

Optionally, $C_{bitmap,1}$ is a value related to $\mu$. For example, if $\mu=0$, then $C_{bitmap,1}=8$. If $\mu=1$, then $C_{bitmap,1}=4$. If $\mu=2$, then $C_{bitmap,1}=2$. If $\mu=3$, then $C_{bitmap,1}=1$. For another example, $C_{bitmap,1}=8/N_{slot}^{subframe,\mu}$.

Optionally, the value of $L_{bitmap}$ is related to $T_{Period}^{TDD}$. For example, $L_{bitmap}=C_{bitmap,2} \cdot T_{Period}^{TDD}$, wherein Optionally, $C_{bitmap,2}$ is a constant. For example, $C_{bitmap,2}=1$, or $C_{bitmap,2}=2$, or $C_{bitmap,2}=3$, or $C_{bitmap,2}=4$, or $C_{bitmap,2}=5$, or $C_{bitmap,2}=6$, or $C_{bitmap,2}=7$, or $C_{bitmap,2}=8$, or $C_{bitmap,2}=9$, or $C_{bitmap,2}=10$.

Optionally, $C_{bitmap,2}$ is a configured or pre-configured value.

Determine that the bitmap $B=(b_0, b_1, \ldots, b_{L_{bitmap}-1})$. For example, $b_0, b_1, \ldots, b_{L_{bitmap}-1}$ are respectively equal to $p_0, p_1, \ldots, p_{L_{bitmap}-1}$, or $b_0, b_1, \ldots, b_{L_{bitmap}-1}$ are respectively equal to $p_{L_{bitmap}-1}, p_{L_{bitmap}-2}, \ldots, p_0$, or $b_0, b_1, \ldots, b_{L_{bitmap}-1}$ are respectively equal to $p_{N_{TimeResource}-L_{bitmap}}, p_{N_{TimeResource}-L_{bitmap}+1}, p_{N_{TimeResource}-1}$, or $b_0, b_1, \ldots, b_{L_{bitmap}-1}$ are respectively equal to $p_{N_{TimeResource}-1}, p_{N_{TimeResource}-2}, \ldots, p_{N_{TimeResource}-L_{bitmap}}$.

Determine a candidate slot set $S_{SLSlot,0}=\{l_0, l_1, \ldots, l_{N_{SLSlot,0}-1}\}$, wherein:

Optionally, $N_{SLSlot,0}$ is the number of elements in the set $S_{SLSlot,0}$.

Optionally, the set $S_{SLSlot,0}$ may be any one of the following:

$S_{All}-S_{SSSB}.$
$S_{All}-S_{NonSLSlot}.$
$S_{All}-S_{SSSBOrNonSLSlot}.$
$S_{All}-S_{SSSB}-S_{NonSLSlot}.$
$S_{All}-S_{SSSB}-S_{SSSBOrNonSLSlot}.$ wherein:
$S_{All}$ is a set of all slots in the time-domain resource period $T_{Period}^{SL}$. The number of elements in the set $S_{All}$ is denoted as $N_{All}$ (for example, $N_{All}=T_{Period}^{SL} \cdot N_{slot}^{subframe,\mu}$).

$S_{SSSB}$ is a set of slots configured with an S-SSB within the time-domain resource period $T_{Period}^{SL}$. The number of elements in the set $S_{SSSB}$ is denoted as $N_{SSSB}$.

$S_{NonSLSlot}$ is a set of slots not meeting an SL candidate slot condition within the time-domain resource period $T_{Period}^{SL}$. The number of elements in the set $S_{NonSLSlot}$ is denoted as $N_{NonSLSlot}$.

$S_{SSSBOrNonSLSlot}$ is a set of slots configured with an S-SSB or not meeting the SL candidate slot condition within the time-domain resource period $T_{period}^{SL}$. The number of elements in the set $S_{SSSBOrNonSLSlot}$ is denoted as $N_{SSSBOrNonSLSlot}$.

Optionally, $N_{SLSlot,0}$ may be equal to any one of the following:
$N_{All}-N_{SSSB}.$
$N_{All}-N_{NonSLSlot}.$
$N_{All}-N_{SSSBOrNonSLSlot}.$
$N_{All}-N_{SSSB}-N_{NonSLSlot}.$
$N_{All}-N_{SSSB}-N_{SSSBOrNonSLSlot}.$ Optionally, $l_0, l_1, \ldots l_{N_{SLSlot,0}-1}$ are arranged in chronological order.

Optionally, $l_0, l_1, \ldots l_{N_{SLSlot,0}-1}$ are arranged in ascending order of slot numbers.

Determine a set $S_{Reserved}$ of reserved slots. The number of elements in the set $S_{Reserved}$ is denoted as $N_{Reserved}$, wherein:

Optionally, $N_{Reserved}=N_{SLSlot,0} \mod L_{bitmap}$.

Optionally, if $N_{Reserved}=0$, then $S_{Reserved}$ is an empty set.

Optionally, if slot $l_r$ in the set $S_{SLSlot,0}$ and/or $N_{Reserved}$ meets a reserved slot condition, then slot $l_r$ is a reserved slot. The reserved slot condition is one or more of the following (in any combination of "and" or "or" where applicable):

$$r = \left\lfloor \frac{m \cdot N_{SLSlot,o}}{N_{Reserved}} \right\rfloor, \text{wherein } m \in \{0, 1, \ldots, N_{Reserved} - 1\}.$$

$$r = \left\lfloor \frac{m \cdot N_{SLSlot,o}}{N_{Reserved}} \right\rfloor, \text{wherein } m = 0, 1, \ldots, N_{Reserved} - 1.$$

$N_{Reserved} > 0.$ $N_{Reserved} \neq 0.$

Determine a slot set $S_{SLSlot,nb}=\{m_0, m_1, \ldots, m_{N_{SLSlot,nb}-1}\}$ before the bitmap is used.

wherein:
Optionally, $N_{SLSlot,nb}$ is the number of elements in the set $S_{SLSlot,nb}$.

Optionally, the set $S_{SLSlot,nb}$ may be any one of the following:
$S_{All}-S_{SSB}-S_{Reserved}.$
$S_{All}-S_{NonSLSlot}-S_{Reserved}.$
$S_{All}-S_{SSSBOrNonSLSlot}-S_{Reserved}.$
$S_{All}-S_{SSSB}-S_{NonSLSlot}-S_{Reserved}.$
$S_{All}-S_{SSSB}-S_{SSSBOrNonSLSlot}-S_{Reserved}.$
$S_{SLSlot,0}-S_{Reserved}.$
$S_{All}-S_{SSSB}.$
$S_{All}-S_{NonSLSlot}.$
$S_{All}-S_{SSSBOrNonSLSlot}.$
$S_{All}-S_{SSB}-S_{NonSLSlot}.$
$S_{All}-S_{SSB}-S_{SSSBOrNonSLSlot}.$ Optionally, $N_{SLSlot,nb}$ may be equal to any one of the following:
$N_{All}-N_{SSSB}-N_{Reserved}.$
$N_{All}-N_{NonSLSlot}-N_{Reserved}.$
$N_{All}-N_{SSSBOrNonSLSlot}-N_{Reserved}.$
$N_{All}-N_{SSSB}-N_{NonSLSlot}-N_{Reserved}.$
$N_{All}N_{SSSB}-S_{SSSBOrNonSLSlot}-N_{Reserved}.$
$N_{SLSlot,0}-N_{Reserved}.$ Optionally, $m_0, m_1, \ldots, m_{N_{SLSlot,nb}-1}$ are arranged in chronological order.

Optionally, $m_0, m_1, \ldots, m_{N_{SLSlot,nb}-1}$ are arranged in ascending order of slot numbers.

Determine a slot set $S_{SLSlot,wb}$ after the bitmap is used (the number of elements in the set $S_{SLSlot,wb}$ is denoted as $N_{SLSlot,wb}$). For example, one or more of the following is performed (in any order where applicable):

The set $S_{SLSlot,wb}$ is initialized to be an empty set.

For each $k \in \{0, 1, \ldots, N_{SLSlot,nb}-1\}$, if Slot $m_k$ in the set $S_{SLSlot,nb}$ meets a first resource pool bitmap condition, then slot $m_k$ belongs to the set $S_{SLSlot,wb}$ (or slot $m_k$ is included in the set $S_{SLSlot,wb}$). The first resource pool bitmap condition is one or more of the following (in any combination of "and" or "or" where applicable):

$b_k=1$, wherein k'=k mod $L_{bitmap}$ (or written as k'=(k mod $L_{bitmap}$)).

$b_k=0$, wherein k'=k mod $L_{bitmap}$ (or written as k'=(k mod $L_{bitmap}$)).

The elements in the set $S_{SLSlot,wb}$ are arranged in chronological order.

The elements in the set $S_{SLSlot,wb}$ are arranged in ascending order of slot numbers.

Determine a slot set $S_{SLSlot,wp}$ after PSFCH resources are aligned (optionally, this operation is performed only when the resource pool is configured with PSFCH resources). For example, one or more of the following is performed (in any order where applicable):

The set $S_{SLSlot,wp}$ is initialized to be equal to $S_{init}$ (the number of elements in the set $S_{init}$ is denoted as $N_{init}$). For example, $S_{init}=S_{SLSlot,wb}$ (correspondingly, $N_{init}=N_{SLSlot,wb}$). For another example, $S_{init}=S_{SLSlot,nb}$ (correspondingly, $N_{init}=N_{SLSlot,nb}$). For another example, $S_{init}=S_{SLSlot,0}$ (correspondingly, $N_{init}=N_{SLSlot,0}$).

$N_{removed}$ elements in the set $S_{SLSlot,wp}$ are removed (for example, the last $N_{removed}$ elements, or the first $N_{removed}$ elements), wherein:

$N_{removed}$ is a value related to $N_{PSSCH}^{PSFCH}$. For example, $N_{removed}=N_{init} \mod N_{PSSCH}^{PSFCH}$.

Determine that the set $S_{RP}$ is any one of the following:
$S_{SLSlot,wp}.$
$S_{SLSlot,wb}.$
$S_{SLSlot,nb}.$
$S_{SLSlot,0}.$ Optionally, in Embodiment 1 of the present invention, "configured" may be replaced with "pre-configured."

Optionally, in Embodiment 1 of the present invention, "configured" may be replaced with "configured or pre-configured."

Optionally, in Embodiment 1 of the present invention, "not configured" may be replaced with "not pre-configured."

Optionally, in Embodiment 1 of the present invention, "not configured" may be replaced with "not configured and or not pre-configured."

Optionally, in Embodiment 1 of the present invention, "not configured" may be replaced with "not (pre-)configured."

Optionally, in Embodiment 1 of the present invention, "quasi-uplink slot" (also referred to as "uplink slot" when the context is clear) refers to a slot meeting a quasi-uplink slot condition. For given slot l, the quasi-uplink slot condition refers to one or more of the following (in any combination of "and" or "or" where applicable):

In slot l, a symbol $l_{start}^{SL}$, a symbol $l_{start}^{SL}+1$, ......, and a symbol $l_{start}^{SL}+N_{length}^{SL}-1$ are configured to be uplink symbols.

In slot l, at least a symbol $l_{start}^{SL}$, a symbol $l_{start}^{SL}+1$, ......, and a symbol $l_{start}^{SL}+N_{length}^{SL}-1$ are configured to be uplink symbols.

In slot l, all symbols (for example, for NCP, symbol 0, symbol 1, ..., symbol 13; for another example, for ECP, symbol 0, symbol 1, ..., symbol 11) are configured to be uplink symbols.

Optionally, in Embodiment 1 of the present invention, for given slot l, the SL candidate slot condition refers to one or more of the following (in any combination of "and" or "or" where applicable):

In slot l, a symbol $l_{start}^{SL}$, a symbol $l_{start}^{SL}+1$, ......, and a symbol $l_{start}^{SL}+N_{length}^{SL}-1$ are configured to be UL symbols.

In slot l, at least a symbol $l_{start}^{SL}$, a symbol $l_{start}^{SL}+1$, ......, and a symbol $l_{start}^{SL}+N_{length}^{SL}-1$ are configured to be UL symbols.

In slot l, all symbols (for example, for NCP, symbol 0, symbol 1, ..., symbol 13; for another example, for ECP, symbol 0, symbol 1, ..., symbol 11) are configured to be UL symbols.

Optionally, in Embodiment 1 of the present invention, the uplink slot condition is equal to the SL candidate slot condition.

Optionally, in Embodiment 1 of the present invention, the SL candidate slot condition is equal to the uplink slot condition.

Optionally, in Embodiment 1 of the present invention, another unit is used for the period of $T_{Period}^{SL}$ (for example, slot, and correspondingly, $T_{Period}^{SL} \cdot N_{slot}^{subframe,\mu}$ may be replaced with $T_{Period}^{SL}$).

Optionally, in Embodiment 1 of the present invention, $N_{slot}^{subframe,\mu}$ may be replaced with $2^\mu$.

Optionally, in Embodiment 1 of the present invention, $2^\mu$ may be replaced with $N_{slot}^{subframe,\mu}$.

Optionally, in Embodiment 1 of the present invention, $2^{\mu-\mu_{ref}}$ may be replaced with $(N_{slot}^{subframe,\mu}/N_{slot}^{subframe,\mu_{ref}})$.

Optionally, in Embodiment 1 of the present invention, $(N_{slot}^{subframe,\mu}/N_{slot}^{subframe,\mu_{ref}})$ may be replaced with $2^{\mu-\mu_{ref}}$.

Optionally, in Embodiment 1 of the present invention, an SLSS may be replaced with an S-SSB.

Optionally, in Embodiment 1 of the present invention, an S-SSB may be replaced with an SLSS.

Optionally, in Embodiment 1 of the present invention, 10240 may be replaced with $T_{Period}^{SFN} \cdot N_{subframe}^{frame}$, where $T_{Period}^{SFN}=1024$ (milliseconds), and $N_{subframe}^{frame}=10$.

Optionally, in Embodiment 1 of the present invention, the "reference frame number" may be an SFN, for example, when a serving cell is used as a timing reference. Correspondingly, "reference frame number period" is an SFN period (1024 frames having a duration of 10240 milliseconds).

Optionally, in Embodiment 1 of the present invention, the "reference frame number" may be a DFN, for example, when no serving cell is used as the timing reference (for example, when another UE on the SL is used as the timing reference, or when the GNSS is used as the timing reference). Correspondingly, "reference frame number period" is a DFN period (1024 frames having a duration of 10240 milliseconds).

Optionally, the method for the quasi-uplink slot in the TDD configuration period $T_{Period}^{TDD}$ shown in Embodiment 1 of the present invention can be used to determine, during transmission of a MasterInformationBlockSidelink message, "quasi-uplink slot" information in the MasterInformationBlockSidelink message.

Therefore, according to Embodiment 1, the present invention provides a method in which a slot set in a resource pool is flexibly determined so that different UEs can perform efficient SL transmission and reception on the basis of the same resource pool.

Variant Embodiment

Figure 2:
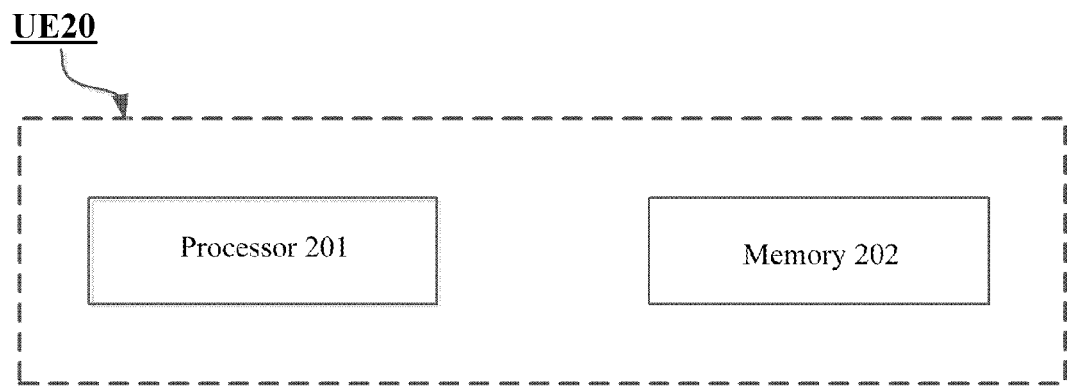
FIG. 2 shows a block diagram of user equipment (UE) according to the present invention.

Hereinafter, FIG. 2 is used to illustrate user equipment that can perform the method performed by user equipment described in detail above in the present invention as a variant embodiment.

FIG. 2 is a block diagram showing the user equipment (UE) involved in the present invention.

As shown in FIG. 2, user equipment (UE) 20 includes a processor 201 and a memory 202. The processor 201 may include, for example, a microprocessor, a microcontroller, an embedded processor, and the like. The memory 202 may include, for example, a volatile memory (such as a random access memory (RAM)), a hard disk drive (HDD), a non-volatile memory (such as a flash memory), or other memories. The memory 202 stores program instructions. The instructions, when run by the processor 201, can perform the above method performed by user equipment as described in detail in the present invention.

The methods and related equipment according to the present invention have been described above in combination with preferred embodiments. It should be understood by those skilled in the art that the methods shown above are only exemplary, and the above embodiments can be combined with one another as long as no contradiction arises. The methods of the present invention are not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant to limit the present invention. The present invention is not limited to specific information elements serving as examples of these identifiers. A person skilled in the art could make various alterations and modifications according to the teachings of the illustrated embodiments. Those skilled in the art should understand that part of or all of the mathematical expressions, mathematical equations, or mathematical inequalities may be simplified (for example, incorporating constant terms, or interchanging two addition terms) or transformed or rewritten to some extent. Mathematical expressions, mathematical equations, or mathematical inequalities before and after the simplification or transformation or rewriting may be considered to be equivalent to each other.

It should be understood that the above-described embodiments of the present invention may be implemented by software, hardware, or a combination of software and hardware. For example, various components inside the base station and the user equipment in the above embodiments may be implemented through various devices, which include, but are not limited to, analog circuit devices, digital circuit devices, digital signal processing (DSP) circuits, programmable processors, application specific integrated circuits (ASICs), field programmable gate arrays (FPGAs), programmable logic devices (CPLDs), and the like.

In this application, the term "base station" may refer to a mobile communication data and control switching center having specific transmission power and a specific coverage area and including functions such as resource allocation and scheduling, data reception and transmission, and the like. "User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon. When executed on a computing device, the computer program logic provides related operations to implement the above technical solutions of the present invention. When executed on at least one processor of a computing system, the computer program logic causes the processor to perform the operations (methods) described in the embodiments of the present invention. Such setting of the present invention is typically provided as software, codes and/or other data structures provided or encoded on the computer readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:

1. A method performed by the user equipment (UE), comprising:
   setting a content of a message in a physical sidelink broadcast channel (PSBCH) of a sidelink synchronization signal (S-SS)/PSBCH block, including an indication of the number $N^{TDD}_{ULSlot}$ of UL slots for sidelink in a TDD configuration, wherein
   the UE determines, based on the TDD configuration, the number $N^{TDD}_{ULSlot}$ so that the number $N^{TDD}_{ULSlot}$ is equal to $u_{slots} \cdot 2^{\mu - \mu_{ref}} + \left\lfloor \frac{(u_{sym} \cdot 2^{\mu - \mu_{ref}})}{N^{slot}_{symb}} \right\rfloor + N_{0,1}$, $N^{slot}_{symb}$ is the number of symbols in a slot,
   $N_{0,1}$ is 1 if a condition $((u_{sym} \cdot 2^{\mu - \mu_{ref}}) \mod N^{slot}_{symb}) \geq N^{slot}_{symb} - 1^{SL}_{start}$ is satisfied,
   $N_{0,1}$ is 0 if the condition $((u_{sym} \cdot 2^{\mu - \mu_{ref}}) \mod N^{slot}_{symb}) \geq N^{slot}_{symb} - 1^{SL}_{start}$ is not satisfied,
   $1^{SL}_{start}$ is a sidelink starting symbol index provided by a parameter sl-StartSymbol,
   $\mu_{ref}$ is a reference SCS configuration provided by a parameter referenceSubcarrierSpacing of the TDD configuration,
   $\mu$ corresponds to a SCS configuration of the sidelink,
   $u_{slots}$ is the number of slots with only uplink symbols provided by parameter nrofUplinkSlots of a first pattern of the TDD configuration, and
   $u_{sym}$ is the number of uplink symbols provided by a parameter nrofUplinkSymbols of the first pattern of the TDD configuration, and
   transmitting the S-SS/PSBCH block.

2. User equipment (UE), characterized by comprising:
   a processor; and
   a memory storing instructions, wherein the instructions, when run by the processor, perform a method including:
   setting a content of a message in a physical sidelink broadcast channel (PSBCH) of a sidelink synchronization signal (S-SS)/PSBCH block, including an indication of the number $N^{TDD}_{ULSlot}$ of UL slots for sidelink in a TDD configuration, wherein
   the UE determines, based on the TDD configuration, the number $N^{TDD}_{ULSlot}$ so that the number $N^{TDD}_{ULSlot}$ is equal to $u_{slots} \cdot 2^{\mu - \mu_{ref}} + \left\lfloor \frac{(u_{sym} \cdot 2^{\mu - \mu_{ref}})}{N^{slot}_{symb}} \right\rfloor + N_{0,1}$ $N^{slot}_{symb}$ is the number of symbols in a slot, $N_{0,1}$ is 1 if a condition $((u_{sym} \cdot 2^{\mu-\mu_{ref}}) \mod N^{slot}_{symb}) \geq N^{slot}_{symb} - 1^{SL}_{start}$ is satisfied, $N_{0,1}$ is 0 if the condition $((u_{sym} \cdot 2^{\mu-\mu_{ref}}) \mod N^{slot}_{symb}) \geq N^{slot}_{symb} - 1^{SL}_{start}$ is not satisfied, $1^{SL}_{start}$ is a sidelink starting symbol index provided by a parameter sl-StartSymbol, $\mu_{ref}$ is a reference SCS configuration provided by a parameter referenceSubcarrierSpacing of the TDD configuration, $\mu$ corresponds to a SCS configuration of the sidelink, $u_{slots}$, is the number of slots with only uplink symbols provided by parameter nrofUplinkSlots of a first pattern of the TDD configuration, and $u_{sym}$ is the number of uplink symbols provided by a parameter nrofUplinkSymbols of the first pattern of the TDD configuration, and transmitting the S-SS/PSBCH block.

3. The UE according to claim 2, wherein:

the UE sets the content of the message further including an indication of whether the first pattern is configured and a second pattern is not configured, or both of the first pattern and the second pattern is configured for the TDD configuration; and wherein, if the first pattern is configured and the second pattern is not configured, the number $N^{TDD}_{ULSlot}$ is equal to $\mu_{slots}$ $$u_{slots} \cdot 2^{\mu-\mu_{ref}} + \left\lfloor \frac{(u_{sym} \cdot 2^{\mu-\mu_{ref}})}{N^{slot}_{symb}} \right\rfloor + N_{0,1}.$$

4. The UE according to claim 2, wherein the value of $\mu$ is one of 0, 1, 2, and 3, respectively corresponding to a SCS of 15 kHz, 30 kHz, 60 kHz, and 120 kHz.

5. User equipment (UE), characterized by comprising:

a processor; and a memory storing instructions, wherein the instructions, when run by the processor, perform a method including receiving a message in a physical sidelink broadcast channel (PSBCH) of a sidelink synchronization signal (S-SS)/PSBCH block, including an indication of the number $N^{TDD}_{ULSlot}$ of UL slots for sidelink in a TDD configuration, wherein the number $N^{TDD}_{ULSlot}$ is determined, based on the TDD configuration, so that the number $N^{TDD}_{ULSlot}$ is equal to $u_{slots} \cdot 2^{\mu-\mu_{ref}} + \left\lfloor \frac{(u_{sym} \cdot 2^{\mu-\mu_{ref}})}{N^{slot}_{symb}} \right\rfloor + N_{0,1}$, $N^{slot}_{symb}$ is the number of symbols in a slot, $N_{0,1}$ is 1 if a condition $((u_{sym} \cdot 2^{\mu-\mu_{ref}}) \mod N^{slot}_{symb}) \geq N^{slot}_{symb} - l^{SL}_{start}$ is satisfied, $N_{0,1}$ is 0 if the condition $((u_{sym} \cdot 2^{\mu-\mu_{ref}}) \mod N^{slot}_{symb}) \geq N^{slot}_{symb} - l^{SL}_{start}$ is not satisfied, $1^{SL}_{start}$ is a sidelink starting symbol index provided by a parameter sl-StartSymbol, $\mu_{ref}$ is a reference SCS configuration provided by a parameter referenceSubcarrierSpacing of the TDD configuration, $\mu$ corresponds to a SCS configuration of the sidelink, $u_{slots}$, is the number of slots with only uplink symbols provided by parameter nrofUplinkSlots of a first pattern of the TDD configuration, and $u_{sym}$ is the number of uplink symbols provided by a parameter nrofUplinkSymbols of the first pattern of the TDD configuration.

6. The UE, according to claim 5, wherein the message includes an indication of whether the first pattern is configured and a second pattern is not configured, or both of the first pattern and the second pattern is configured for the TDD configuration; and wherein, if the first pattern is configured and the second pattern is not configured, the number $N^{TDD}_{ULSlot}$ is equal to $$u_{slots} \cdot 2^{\mu-\mu_{ref}} + \left\lfloor \frac{(u_{sym} \cdot 2^{\mu-\mu_{ref}})}{N^{slot}_{symb}} \right\rfloor + N_{0,1}.$$

7. The UE according to claim 5, wherein the value of $\mu$ is one of 0, 1, 2, and 3, respectively corresponding to a SCS of 15 kHz, 30 kHz, 60 kHz, and 120 kHz.

* * * * *